Jan. 8, 1924.

M. E. MOREAU

SOLAR FURNACE

Filed April 10, 1922

INVENTOR.
Marcel E. Moreau
By Arthur L. Slee
ATTY.

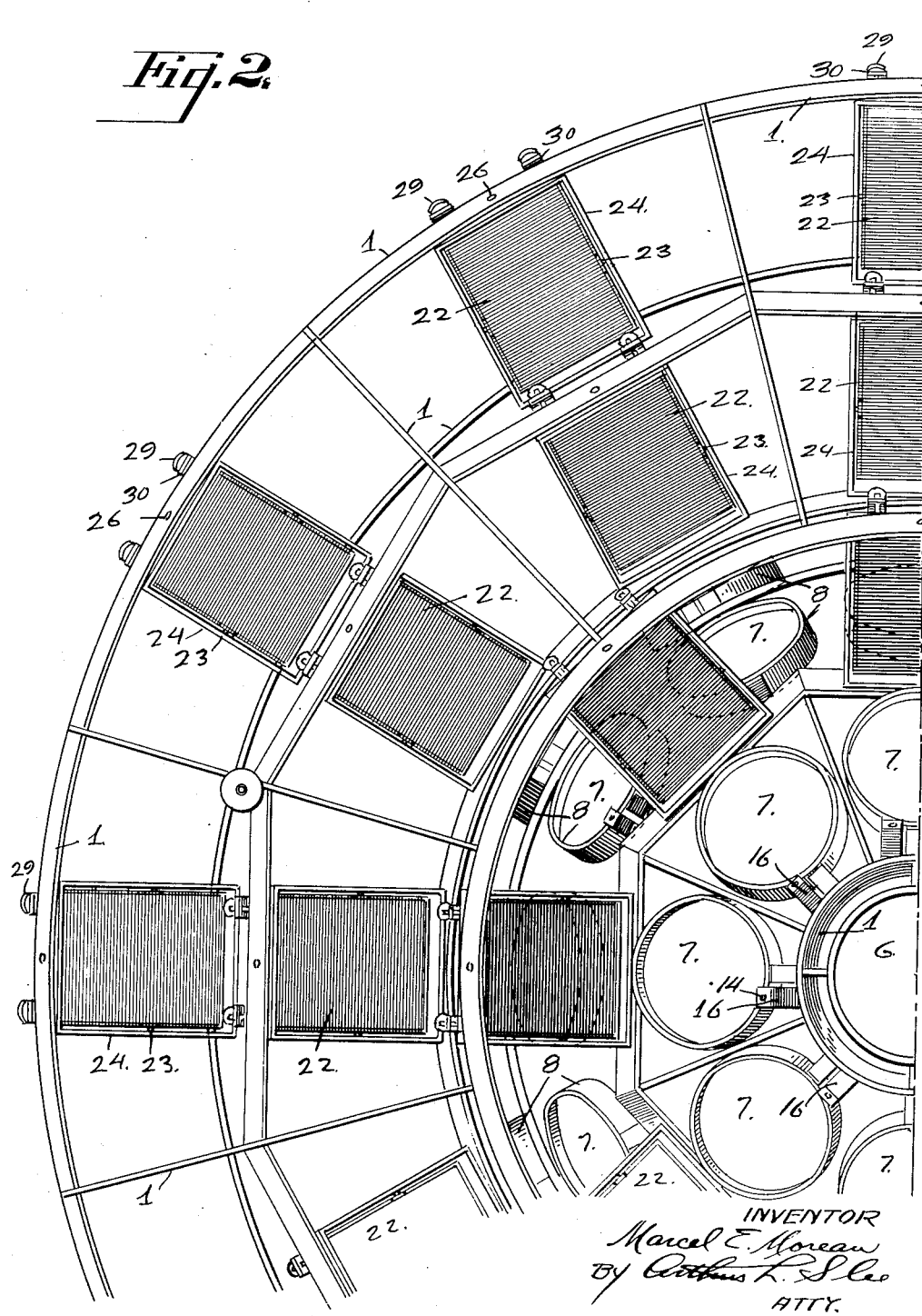

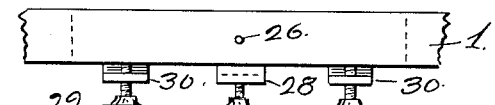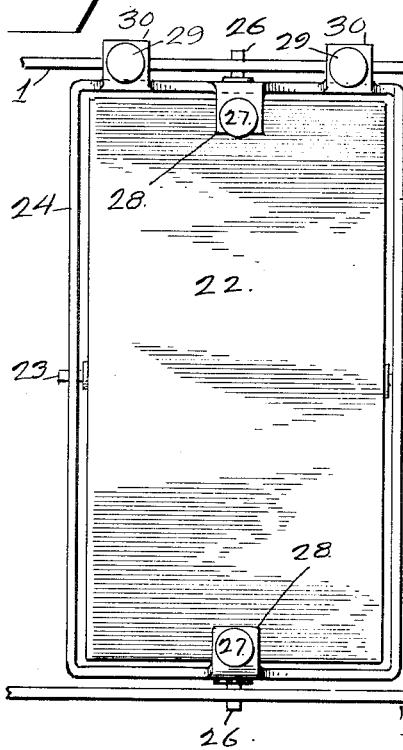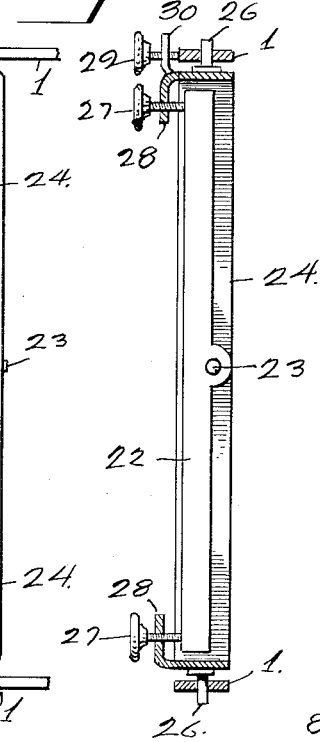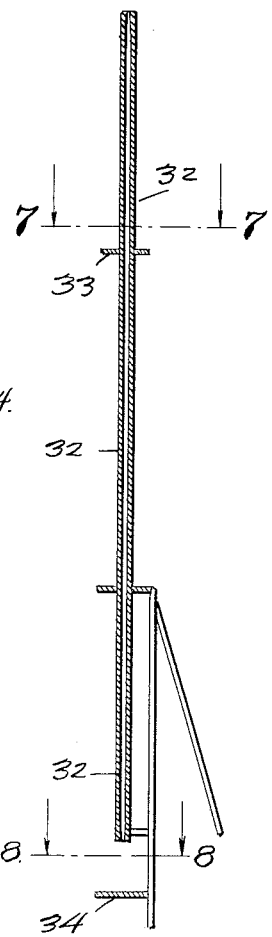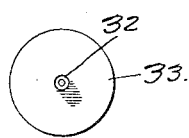

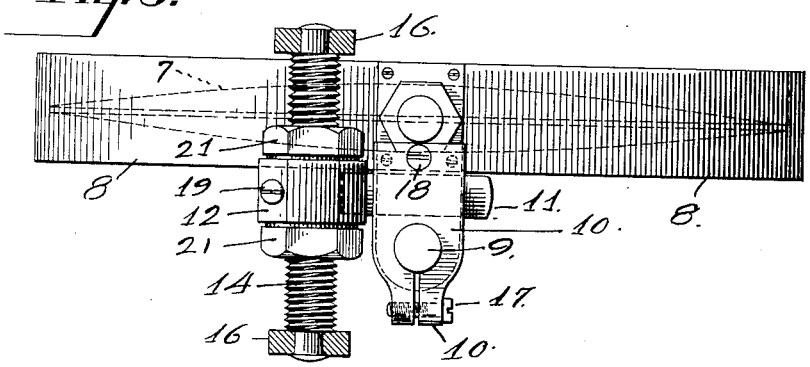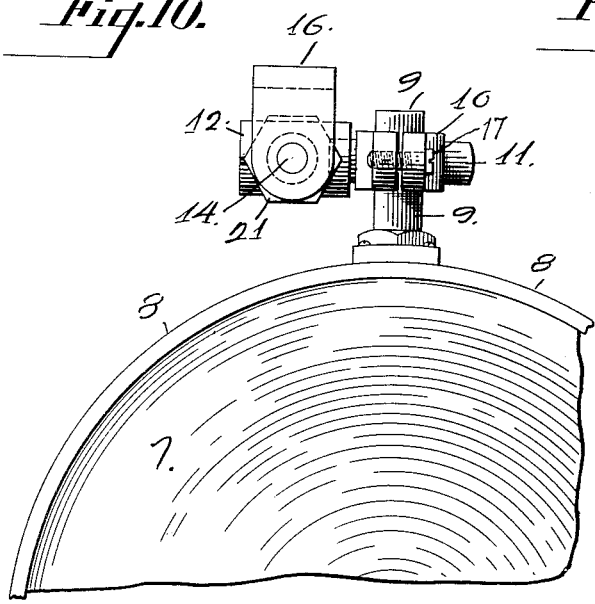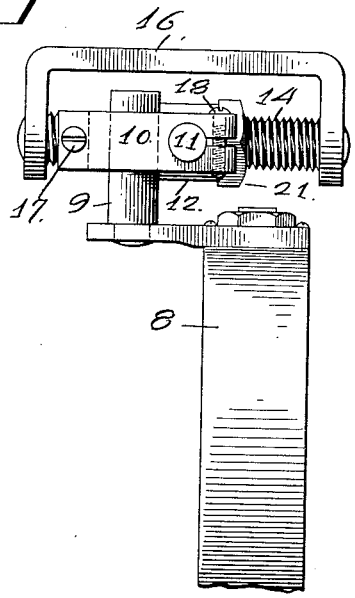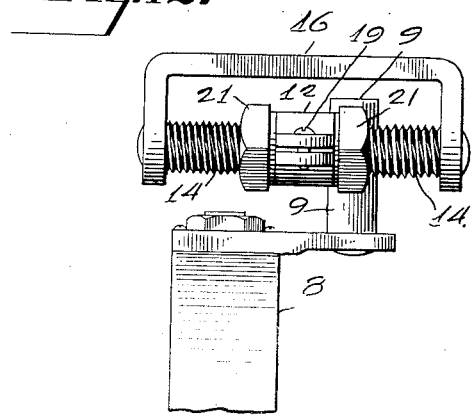

Patented Jan. 8, 1924.

1,479,923

UNITED STATES PATENT OFFICE.

MARCEL E. MOREAU, OF SAN FRANCISCO, CALIFORNIA.

SOLAR FURNACE.

Application filed April 10, 1922. Serial No. 551,294.

*To all whom it may concern:*

Be it known that I, MARCEL ELOI MOREAU, a citizen of the United States, residing in the city and county of San Francisco and State of California, have invented a new and useful Improvement in a Solar Furnace, of which the following is a specification.

My invention relates to improvements in solar furnaces wherein a plurality of lenses, arranged to concentrate their focal points on a common center, operate in conjunction with a plurality of adjustable mirrors or reflecting elements arranged to reflect solar rays from a comparatively large area through said lenses to produce an intense heat at the common focal point of said lenses.

The primary object of the present invention is to provide a new and improved solar furnace for producing an intense heat to be used for scientific purposes.

Another object of the invention is to provide a new and improved solar furnace or heater arranged to collect solar rays from a comparatively large area and to concentrate said rays upon a common focal point to produce an intense heat.

A further object of the present invention is to provide a plurality of adjustable lenses arranged around a fixed lens and having their focal points concentrated upon the focal point of said fixed lens, and a plurality of adjustable mirrors arranged to reflect rays parallel to the rays entering the fixed lens into the adjustable lenses, to concentrate solar rays upon the common focal point to produce an intense heat.

A further object of the invention is to provide a new and improved device of the character described having improved means for indicating the maximum effective position of the devices relative to the sun's rays.

A still further object of the present invention is to provide a new and improved device of the type set forth having means for screening one or more of the lenses to graduate and control the amount of solar rays passing therethrough whereby a desired degree of heat may be obtained.

Another object is to provide opaque screens whereby one or more of the adjustable lenses may be rendered inoperative to adjust the amount of heat at the common center or focal point to the required degree.

I accomplish these and other objects by means of the improved device disclosed in the drawings forming a part of the present specification wherein like characters of reference are used to designate similar parts throughout the said specification and drawings, and in which:—

Fig. 2 is a broken plan of Fig. 1;

Fig. 3 is an enlarged plan view of a portion of the frame disclosing the manner in which one of the mirrors is adjustably mounted thereon;

Fig. 4 is a front elevation of Fig. 3;

Fig. 5 is a side elevation, partly in section, of Fig. 4;

Fig. 6 is a vertical sectional view of the position indicating means;

Fig. 7 is a sectional view taken on line 7—7 of Fig. 6 in the direction indicated;

Fig. 8 is a sectional view taken on line 8—8 of Fig. 6 in the direction indicated;

Fig. 9 is an enlarged plan view, partly in section, of one of the adjustable lenses and its adjusting mechanism;

Fig. 10 is a broken front elevation of Fig. 9;

Fig. 11 is a partly broken side elevation of Fig. 10; and

Fig. 12 is an elevation of the opposite side of Fig. 11.

Figure 1:
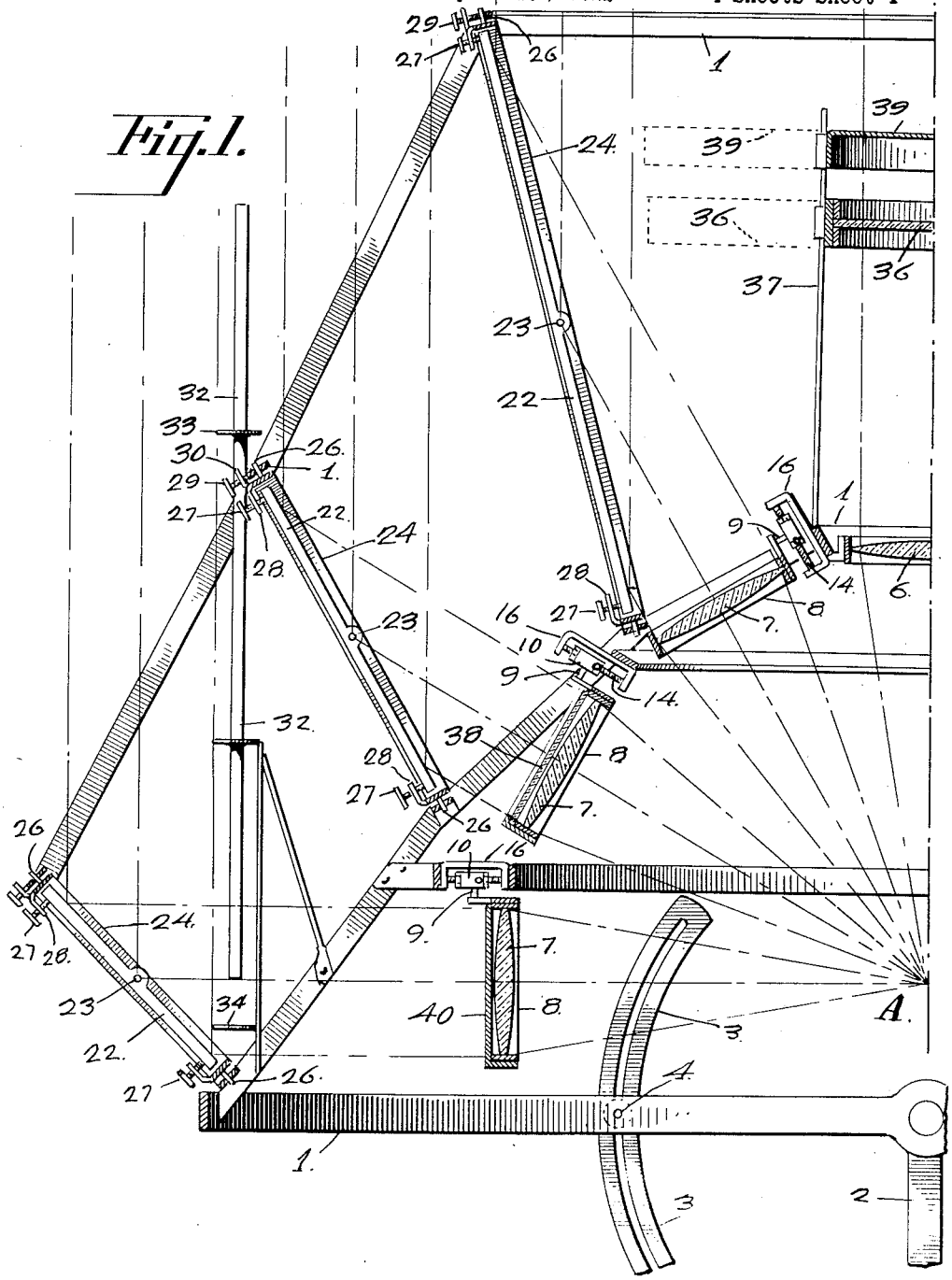
Fig. 1 is a broken vertical sectional view of a portion of the device, disclosing the arrangement of the lenses and mirrors.

Referring to the drawings the numeral 1 is used to designate in general a suitable frame work pivotally mounted upon any suitable rotary base 2, provided with a slotted arcuate arm 3 engaged by a suitable screw or nut 4 in the frame 1 whereby the position of the frame 1 relatively to the base 2 may be fixed temporarily.

A central lens 6 is fixed within the frame 1 and so positioned that its focal point A will lie within the confines of said frame. A plurality of lenses 7, mounted within suitable rings or frames 8, are arranged preferably in semi-spherical form around the focal point A and are universally or adjustably mounted to concentrate their focal points upon the focal point A of the fixed lens 6, which focal point A then becomes a common focal point for all of the lenses.

In Figs. 9 to 12 inclusive I have disclosed one form of means for adjusting each lens whereby its focal point may be accurately focused upon the point A wherein each frame 8 is provided with a pin 9 slidably and rotatably mounted in a member 10 which is in turn slidably and rotatably mounted upon a pin 11, arranged transversely to the pin 8 and rigidly secured to a collar 12 also rotatably and slidably mounted, but not screwed, upon a threaded rod 14 rigidly mounted within a suitable yoke 16 rigidly secured to the main frame 1. The member 10 is provided with suitable split ends and screws 17 and 18 to rigidly engage and prevent the turning of the pins 9 and 11 respectively while the collar 12 is provided with a similar screw 19 to prevent rotation of said collar on the threaded rod 14.

Incidentally the collar 12 is moved along the threaded rod 14 by rotating nuts 21 screwed upon said rod 14 whereby the lens 8 and its frame 9 may be moved longitudinally of the light rays passing therethrough to adjust the focal point of said lens upon the common focal point A.

As the pins 9 and 11, and the threaded rod 14 are arranged at right angles to each other it is obvious that the frame 8 and lens 7 therein may be moved in three directions and rotated upon said pins and rod within three different planes thereby providing what might be termed, a universal adjustment to secure accuracy in concentrating the focal point of each lens 7 upon the common focal point A.

In order to collect and concentrate solar rays parallel to the solar rays entering the fixed lens 6 I have provided a plurality of reflecting elements or mirrors 22 which are pivotally mounted opposite each lens 7 at a proper angle to reflect said parallel solar rays, as indicated by the dot and dash lines in Fig. 1 of the drawings, through their respective lenses 7. Each mirror 22 is independently and pivotally mounted as at 23 within a supporting frame 24 which is in turn pivotally mounted upon the main frame 1 as at 26, the pivotal axes 23 of the mirrors 22 being arranged at right angles to the pivoted axes 26 of the supporting frames 24 whereby the said mirrors 22 may be accurately adjusted to reflect said parallel solar rays directly through the lenses 7.

These adjustments are effected and maintained by means of suitable screws 27 mounted within lugs 28 formed integral with the supporting frames 24 and engaging the opposite tilting ends or sides of the mirrors 22 while similar screws 29 are mounted in other lugs 30 also formed integral with the supporting frames 24 and engaging the main frame 1 on opposite sides of the pivots 26 of said supporting frames 24. By means of this simple and novel arrangement the planes of the mirrors 22 may be adjusted and maintained in correct position to reflect parallel solar rays directly into the lenses 7.

In order to position the lenses relatively to the solar rays to obtain a maximum efficiency, it is, of course, essential that the fixed lens 6 must be primarily positioned transversely to the solar rays entering it, and as said lens 6 is fixed the entire device must be properly positioned.

As a means of indicating absolute or maximum efficiency position of the lens 6 to said solar rays I have provided the indicating tube 32 having an upper annular flange 33 and a lower sighting disc 34 arranged below said indicating tube 32. This tube is accurately positioned transversely to the fixed lens 6 and rigidly connected to the main frame 1.

The entire device is positioned by first moving the frame on its rotatable standard 2 until the shadow of the upper portion of the tube 32 casts no shadow on the annular flange 33. When near the correct position a slight shadow of the upper portion of the tube 32 will be cast on the flange 33 as indicated in Fig. 7 of the drawings. The device is then manipulated until no shadow appears. The ends of the tube 32 are provided with restricted openings and the entire device is now moved slightly to a position where an infinitesimal number of rays may traverse the said tube 32 and appear in the center of the shadow S on the sighting disc 34 as disclosed in Fig. 8 of the drawings.

As the position of the sun changes the position of the device may be changed periodically until the rays reappear on the disc 34.

In order to regulate and control the amount of heat concentrated at the common focal point A of all of the lenses, I have provided screens of various density whereby various degrees of heat may be absorbed or screened out before said rays reach said common focal point A. These screens may be in the form of the glass screen 36 rotatably mounted upon a suitable standard 37 secured to the main frame 1 whereby they may be easily moved into and out of operative position, or said screens may be in the form of caps as shown at 38 in Fig. 1 of the drawings.

In order to cut out and entirely prevent the passage of solar rays through one or more of the lenses I have provided opaque caps 39 which may be similarly rotatably mounted upon the standard 37 or an opaque cap 40 arranged to fit directly over the lens frame 8 as disclosed in the lower portion of Fig. 1 of the drawings.

The heat concentrated by any one lens may be readily measured and determined by cutting out all of the other lenses. Similarly the degree of heat obtained may be adjusted by testing out the absorbing qualities of any screen. In this manner any quantity of heat, within the range of the device, may be readily produced by exposing the required number of lenses in conjunction with suitable screens. The principal utility of the device will be found in determining the melting point of extremely hard elements, such as porcelain, mica, platinum, steel and other hard products, and it is designed for melting and thereby obtaining the melting point of small particles of these various elements.

In operation, the element to be melted is exposed at the common focal point A where it receives the concentrated heat from the exposed lenses. If these are not sufficient to melt the element exposed other lenses are exposed until the element is melted. From the number of exposed lenses, in conjunction with the screens used, if any, the melting point of the element may be determined.

If it is desired to note the result of exposing an element to a certain degree of heat, that degree of heat is produced at the common focal point A by exposing the required number of lenses.

Having thus described my invention what I claim as new and desire to secure by Letters Patent is:

1. A solar furnace comprising a fixed lens; a plurality of adjustable lenses positioned adjacent the fixed lens and having their focal points concentrated upon the focal point of the fixed lens; and means for reflecting parallel light rays through said adjustable lenses.

2. A solar furnace comprising a fixed lens; a plurality of adjustable lenses positioned adjacent the fixed lens and having their focal points concentrated upon the focal point of the fixed lens; means for reflecting parallel light rays through said adjustable lenses; and means for adjusting the reflecting means whereby parallel light rays may be reflected directly through said adjustable lenses.

3. A solar furnace comprising a fixed lens; a plurality of lenses arranged adjacent the fixed lens; means for concentrating the focal point of one or more of said last mentioned lenses upon the focal point of the fixed lens; and means for reflecting parallel light rays through said second mentioned lenses.

4. A solar furnace comprising a fixed lens arranged transversely to the path of solar rays; a plurality of lenses arranged adjacent to the fixed lens and having their focal points concentrated on the focal point of the fixed lens; and adjustable mirrors arranged to reflect solar rays parallel to the rays entering the fixed lens into the other lenses whereby an intense heat may be produced at said common focal point.

5. A solar furnace comprising a fixed lens arranged transversely to the path of solar rays; a plurality of lenses arranged adjacent to the fixed lens and having their focal points concentrated on the focal point of the fixed lens; adjustable mirrors arranged to reflect solar rays parallel to the rays entering the fixed lens into the other lenses whereby an intense heat may be produced at said common focal point; and means for preventing a portion of said solar rays from passing through any one of said lenses.

6. A solar furnace comprising a fixed lens arranged transversely to the path of solar rays; a plurality of lenses arranged adjacent to the fixed lens and having their focal points concentrated on the focal point of the fixed lens; adjustable mirrors arranged to reflect solar rays parallel to the rays entering the fixed lens into the other lenses whereby an intense heat may be produced at said common focal point; and means for graduating the solar rays passing through any one of said lenses.

7. A solar furnace comprising a fixed lens arranged transversely to the path of solar rays; a plurality of lenses arranged adjacent to the fixed lens and having their focal points concentrated on the focal point of the fixed lens; and adjustable mirrors arranged to reflect solar rays parallel to the rays entering the fixed lens into the other lenses whereby an intense heat may be produced at said common focal point; and means for preventing the passage of said rays through any one of said lenses independently of the other lenses whereby the amount of heat concentrated at the common focal point may be controlled.

8. A solar furnace comprising a fixed lens arranged transversely to the path of solar rays; a plurality of lenses arranged adjacent to the fixed lens and having their focal points concentrated on the focal point of the fixed lens; adjustable mirrors arranged to reflect solar rays parallel to the rays entering the fixed lens into the other lenses whereby an intense heat may be produced at said common focal point; and means for indicating a maximum effective position of said lenses relatively to the parallel solar rays.

9. A solar furnace comprising a pivotally mounted frame; a central lens fixed within said frame, a plurality of lenses adjustably mounted within the frame whereby the focal points of said lenses may be concentrated on the focal point of the fixed lens; and a plurality of mirrors, one for each adjustable lens, adjustably mounted upon said frame and arranged to reflect solar rays parallel to rays entering the fixed lens through said adjustable lenses whereby heat from rays within a comparatively large area may be concentrated at said common focal point of all the lenses, to produce an intense heat at said common focal point.

10. A solar furnace comprising a pivotally mounted frame; a central lens fixed within said frame; a plurality of lenses adjustably mounted within the frame whereby the focal points of said lenses may be concentrated on the focal point of the fixed lens; a plurality of mirrors, one for each adjustable lens, adjustably mounted upon said frame and arranged to reflect solar rays parallel to rays entering the fixed lens through said adjustable lenses whereby heat from rays within a comparatively large area may be concentrated at said common focal point of all the lenses, to produce an intense heat at said common focal point; and means for partially absorbing said rays entering one or more of said lenses whereby the intensity of heat at said focal point may be adjusted and controlled.

11. A solar furnace comprising a pivotally mounted frame; a central lens fixed within said frame; a plurality of lenses adjustably mounted within the frame whereby the focal points of said lenses may be concentrated on the focal point of the fixed lens; a plurality of mirrors, one for each adjustable lens, adjustably mounted upon said frame and arranged to reflect solar rays parallel to rays entering the fixed lens through said adjustable lenses whereby heat from rays within a comparatively large area may be concentrated at said common focal point of all the lenses, to produce an intense heat at said common focal point; and means for screening out and preventing the passage of solar rays through any one or all of the lenses whereby a predetermined quantity of heat may be produced at said common focal point.

In witness whereof I hereunto set my signature.

MARCEL E. MOREAU.